United States Patent
Miyazaki et al.

(10) Patent No.: US 9,317,166 B2
(45) Date of Patent: Apr. 19, 2016

(54) DISPLAY DEVICE WITH A BUILT-IN TOUCH PANEL

(71) Applicant: Japan Display Inc., Tokyo (JP)

(72) Inventors: Takahiro Miyazaki, Tokyo (JP); Masanari Saitou, Tokyo (JP); Koji Nagata, Tokyo (JP); Shinji Sekiguchi, Tokyo (JP); Tomohiko Ootani, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/207,746

(22) Filed: Mar. 13, 2014

(65) Prior Publication Data

US 2014/0267159 A1    Sep. 18, 2014

(30) Foreign Application Priority Data

Mar. 14, 2013    (JP) .................................. 2013-051958

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01)

(58) Field of Classification Search
CPC ........ G06F 3/041; G06F 3/0412; G06F 3/044
See application file for complete search history.

(56) References Cited

U.S. PATENT DOCUMENTS

| | | | |
|---|---|---|---|
| 2007/0262966 A1 | 11/2007 | Nishimura et al. | |
| 2009/0315843 A1* | 12/2009 | Matsuo ................... | G06F 3/045 345/173 |
| 2010/0214262 A1* | 8/2010 | Ishizaki et al. ................ | 345/174 |
| 2012/0044178 A1 | 2/2012 | Song | |
| 2013/0044074 A1 | 2/2013 | Park et al. | |
| 2013/0194213 A1* | 8/2013 | Chou et al. .................... | 345/173 |

FOREIGN PATENT DOCUMENTS

| | | |
|---|---|---|
| JP | 2006-146895 | 6/2006 |
| TW | 201001262 A | 1/2010 |
| TW | 201101133 A | 1/2011 |
| TW | 201211866 A | 3/2012 |
| TW | 201215976 A | 4/2012 |
| TW | 201243688 A | 11/2012 |
| TW | 201417071 A | 5/2014 |

OTHER PUBLICATIONS

Office Action dated on Nov. 2, 2015 regarding Taiwanese Patent Application No. 103104783.

* cited by examiner

*Primary Examiner* — Charles Hicks
(74) *Attorney, Agent, or Firm* — Typha IP LLC

(57) ABSTRACT

A display device with a built-in touch panel includes a first substrate, a second substrate, plural pixel electrodes provided between the first substrate and the second substrate, plural common electrodes provided between the first substrate and the second substrate, and plural detection electrodes provided on the first substrate. An image is displayed by light control using an electric field generated between the plural pixel electrodes and the plural common electrodes. The presence or absence of touch is detected by a difference in capacitance due to the presence or absence of a material interrupting the electric field generated between one of the detection electrodes and one of the common electrodes. Each of the detection electrodes includes a through hole.

7 Claims, 10 Drawing Sheets

DISPLAY DEVICE WITH A BUILT-IN TOUCH PANEL

CROSS-REFERENCE TO RELATED APPLICATION

The present application claims priority from Japanese application JP2013-51958 filed on Mar. 14, 2013, the content of which is hereby incorporated by reference into this application.

BACKGROUND OF THE INVENTION

1. Field of the Invention

The present invention relates to a display device with a built-in touch panel.

2. Description of the Related Art

In recent years, with the spread of mobile devices, a touch panel technique to support a human-friendly graphical user interface becomes important. As this touch panel technique, an electrostatic capacitive coupling type touch panel is known. In a general electrostatic capacitive coupling type touch panel, a touch panel substrate is provided in which a conductive coating (transparent conductive film) is applied to a surface of a glass substrate, and when a finger touches here, position detection is performed. A liquid crystal display panel with a touch panel is also known in which this touch panel substrate is attached to a surface of a liquid crystal display panel, and when a finger touches a menu screen displayed on the liquid crystal display panel, an operation corresponding to the menu is performed (JP 2006-146895 A).

In a display panel with a touch panel, in general, a touch panel is overlapped on a display region of the display panel to display images and character information and is used. In the related art display panel with the touch panel, the touch panel and the display panel are separately produced, and are overlapped and combined to form the final product. Thus, in the related art display panel with the touch panel, since the separately produced touch panel and display panel must be overlapped, there is a problem that the display panel with the touch panel becomes thick.

SUMMARY OF THE INVENTION

An object of the invention is to provide a display device with a built-in touch panel which can be made thinner than the related art by having the built-in touch panel.

(1) According to an aspect of the invention, a display device with a built-in touch panel includes a first substrate, a second substrate, plural pixel electrodes provided between the first substrate and the second substrate, plural common electrodes provided between the first substrate and the second substrate, and plural detection electrodes provided on the first substrate, an image is displayed by light control using an electric field generated between the plural pixel electrodes and the plural common electrodes, presence or absence of a touch is detected by a difference in capacitance due to presence or absence of a material interrupting the electric field generated between one of the detection electrodes and one of the common electrodes, and each of the detection electrodes includes a through hole. According to this invention, since the touch panel is built in, the display device is thinner than the related art display device with the touch panel. Besides, since the detection electrode includes the though hole, edges increase. Thus, an electric field generated in an opposing region between the detection electrode and the common electrode decreases, and a fringe electric field coming around from the outside of both increases. The fringe electric field is used to detect the presence or absence of the touch. Accordingly, since the fringe electric field increases, the detection sensitivity can be improved.

(2) In the display device with the built-in touch panel as recited in (1), it is preferable that a land part in an electrically floating state is provided inside the through hole.

(3) In the display device with the built-in touch panel as recited in (1) or (2), it is preferable that the plural detection electrodes are arranged with intervals between the adjacent detection electrodes, a dummy electrode in an electrically floating state is provided between the adjacent detection electrodes, and the dummy electrode includes a dummy through hole.

(4) In the display device with the built-in touch panel as recited in (3), it is preferable that a dummy land part in an electrically floating state is provided inside the dummy through hole.

(5) In the display device with the built-in touch panel as recited in any one of (1) to (4), it is preferable that the plural common electrodes extend in a lateral direction, the adjacent common electrodes are arranged side by side in a longitudinal direction, the plural detection electrodes extend in the longitudinal direction and the adjacent detection electrodes are arranged side by side in the lateral direction.

DETAILED DESCRIPTION OF THE INVENTION

Figure 1:
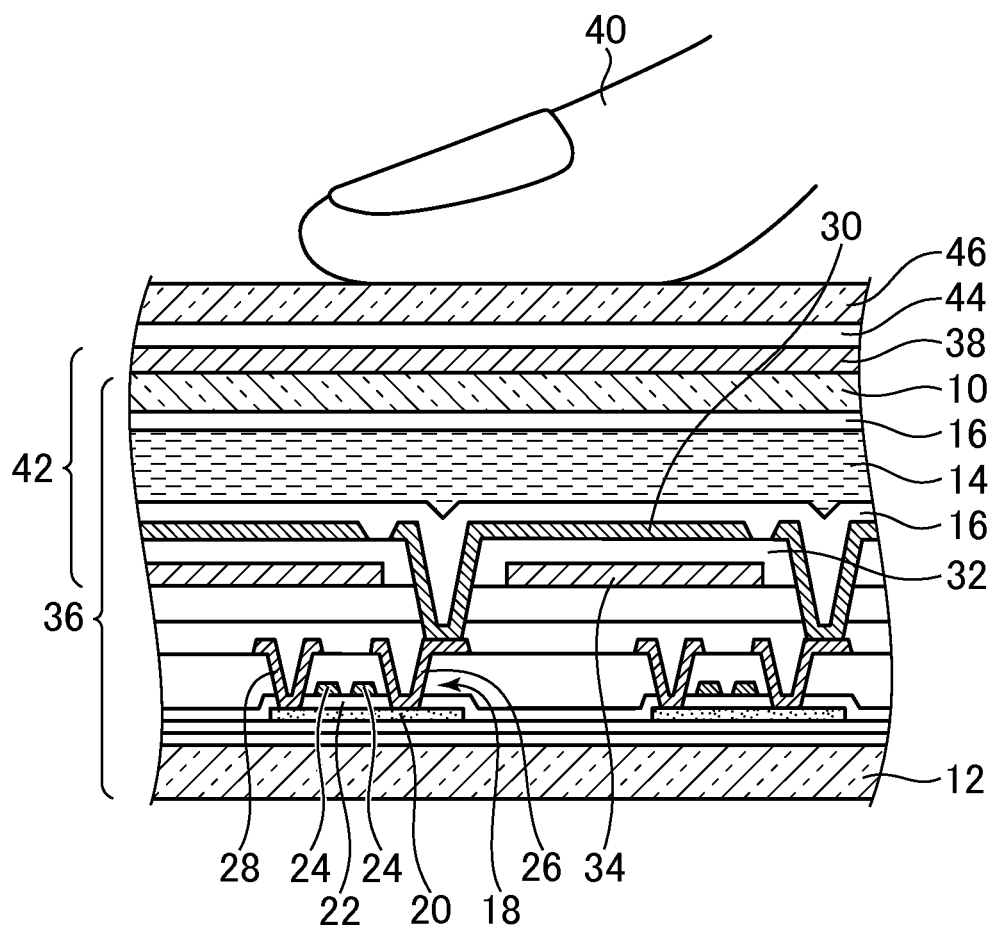
FIG. 1 is a sectional view of a display device with a built-in touch panel according to an embodiment of the invention.
Figure 2:
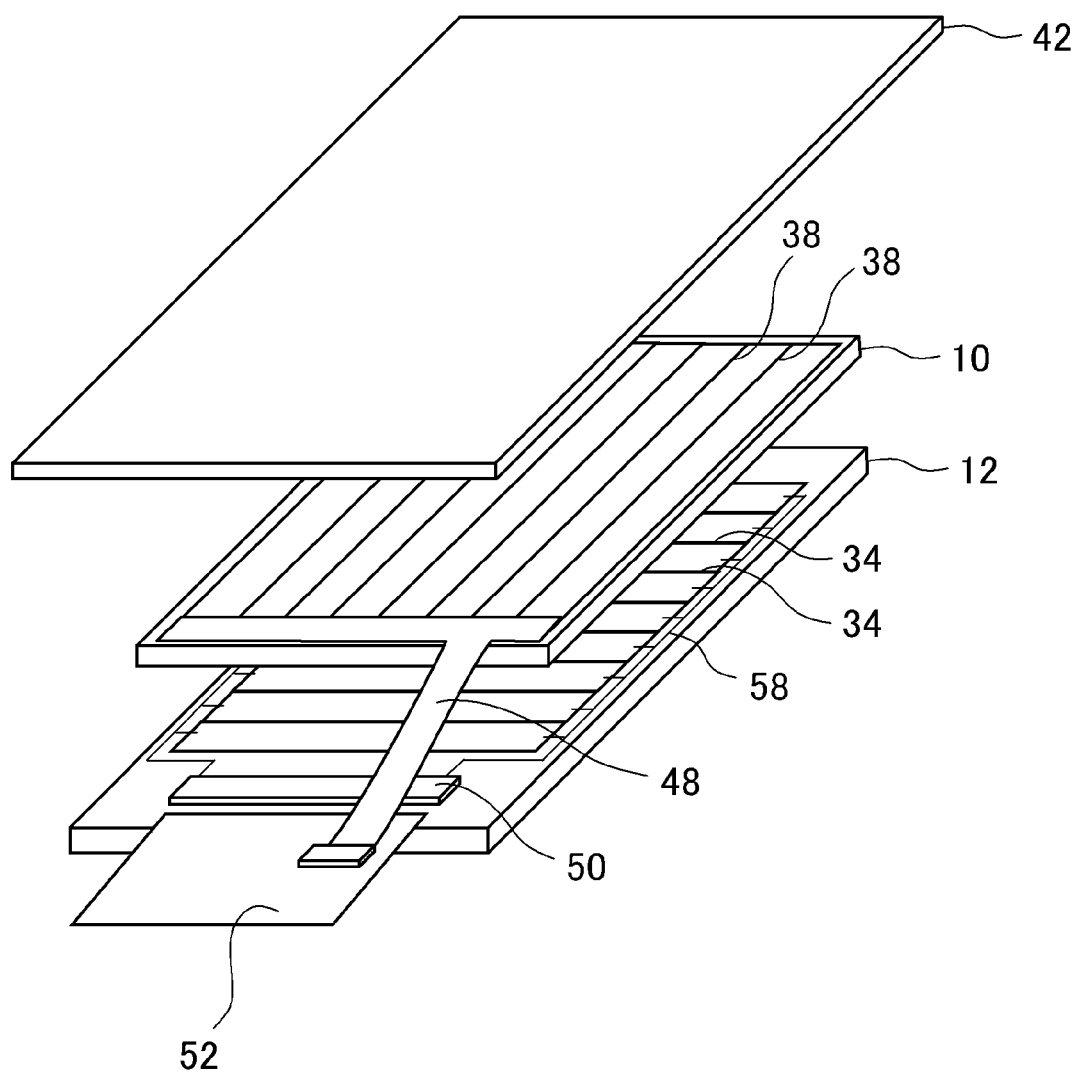
FIG. 2 is a decomposed perspective view of a main part of the display device with the built-in touch panel according to the embodiment of the invention.

FIG. 1 is a sectional view of a display device with a built-in touch panel according to an embodiment of the invention. FIG. 2 is a decomposed perspective view of a main part of the display device with the built-in touch panel according to the embodiment of the invention. Although the following description relates to an example in which the invention is applied to a liquid crystal display device, the invention can be applied also to a display device other than the liquid crystal display device (for example, an EL (Electro Luminescence) display device).

The display device with the built-in touch panel includes a first substrate 10 and a second substrate 12. A liquid crystal material 14 is disposed between the first substrate 10 and the second substrate 12. Orientation films 16 are respectively formed between the first substrate 10 and the second substrate 12 and at positions where they sandwich the liquid crystal material 14.

The first substrate 10 is made of a translucent material (for example, glass). The first substrate 10 is a color filter substrate, and a not-shown colored layer and a black matrix are formed. The orientation film 16 is formed on the first substrate 10. The orientation film 16 is formed on the not-shown colored layer and the black matrix.

The second substrate 12 is made of a translucent material (for example, glass). The second substrate 12 is called also a TFT substrate since a thin film transistor 18 is formed. The thin film transistor 18 includes a semiconductor film 20 of polysilicon or the like, a gate insulating film 22 covering the semiconductor film 20, a gate electrode 24 disposed above the semiconductor film 20 through the gate insulating film 22, and a source electrode 26 and a drain electrode 28 which pass through the gate insulating film 22 and are electrically connected to the semiconductor film 20.

One of the source electrode 26 and the drain electrode 28 is electrically connected to a pixel electrode 30. A common electrode 34 is formed at a layer position different from the pixel electrode 30 through an insulating film 32. In the example of FIG. 1, although the pixel electrode 30 is positioned above the common electrode (on the side distant from the second substrate 12), they may be disposed upside down.

A liquid crystal display panel 36 is constructed of the above parts. An image is displayed by light control using an electric filed generated between the plural pixel electrodes 30 and the plural common electrodes 34. In this embodiment, the liquid crystal material 14 is driven by the electric field generated between the pixel electrodes 30 and the common electrodes 34. Since the pixel electrodes 30 and the common electrodes 34 are formed on the second substrate 12, the electric field generated between the pixel electrodes 30 and the common electrodes 34 is a lateral electric field. Alternatively, the pixel electrodes 30 are formed on the second substrate 12, the common electrodes 34 are formed on the first substrate 10, and the liquid crystal material 14 may be driven by a longitudinal electric filed. In either of the structures, the pixel electrodes 30 and the common electrodes 34 are disposed between the first substrate 10 and the second substrate 12.

The display device with the built-in touch panel includes detection electrodes 38 formed on the first substrate 10. In the example of FIG. 1, the detection electrodes 38 are disposed on a surface of the first substrate 10 on the opposite side to the liquid crystal material 14. As shown in FIG. 2, the plural common electrodes 34 extend in the lateral direction and the adjacent common electrodes are arranged side by side in the longitudinal direction.

The presence or absence of touch is detected by a difference in capacitance due to the presence or absence of a material interrupting the electric field generated between the detection electrodes 38 and the common electrodes 34. Particularly, different voltages are respectively applied to the detection electrode 38 and the common electrode 34 to form the electric field (fringe electric filed) between both the electrodes (particularly, outside the opposing region). The presence or absence of the touch is detected by the difference in the capacitance due to the presence or absence of the material (for example, a finger 40) interrupting the electric field generated between the detection electrode 38 and the common electrode 34. That is, a touch panel 42 is constructed of the first substrate 10, the detection electrodes 38 and the common electrodes 34. The touch panel 42 is bonded with a front panel 46 through an adhesive layer 44 and is reinforced.

According to this embodiment, since the touch panel 42 is built in, the device can be made thinner than the prior art. Besides, since the liquid crystal display panel 36 and the touch panel 42 share the first substrate 10, a countermeasure against superimposing displacement of both is not required.

The first substrate 10 has a rectangular planar shape, and the plural detection electrodes 38 extend in the longitudinal direction along the long side. A flexible wiring substrate 48 for electrical connection between the detection electrodes 38 and the outside is attached to the first substrate 10. An integrated circuit chip 50 having a built-in driving circuit of liquid crystal is mounted on the second substrate 12, and a flexible wiring substrate 52 for electrical connection to the outside is attached.

Figure 3:
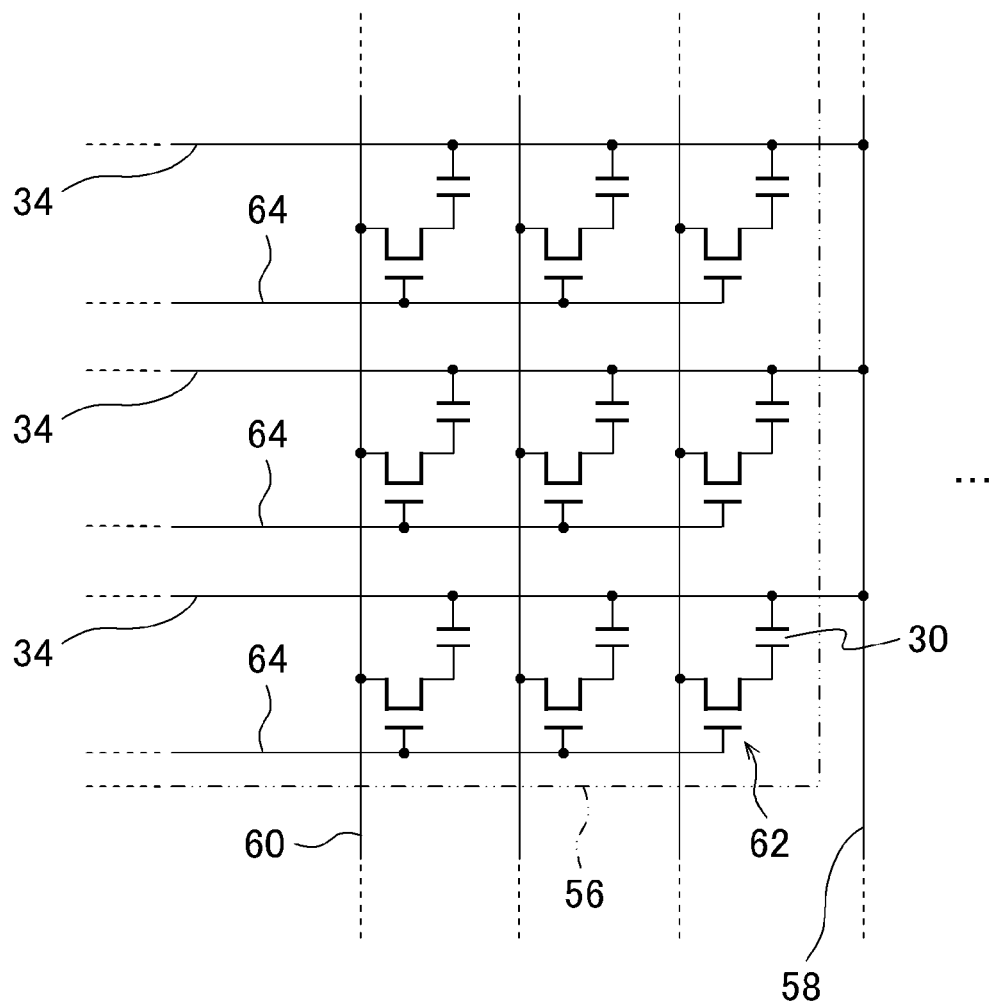
FIG. 3 is a view showing a circuit for displaying an image on a display panel.

FIG. 3 is a view showing a circuit for displaying an image on the liquid crystal display panel 36. The pixel electrodes 30 are formed in an image display region 56. Since pixels are formed of the plural pixel electrodes 30, the region surrounding the plural pixel electrodes 30 is the image display region 56. The common electrodes 34 are formed in the image display region 56. The common electrodes 34 are set to a reference potential (for example, GND), and a voltage corresponding to the brightness of the pixel is applied to the pixel electrode 30. An image is displayed by light control (for example, driving of the liquid crystal material 14) using the electric field generated between the pixel electrodes 30 and the common electrodes 34.

The common electrodes 34 are electrically connected to a common wiring 58, and the pixel electrodes 30 are electrically connected to a signal line 60. A switching element 62 (for example, the thin film transistor 18 shown in FIG. 1) is connected between the pixel electrode 30 and the signal line 60, and electrical conduction and interruption between the pixel electrode 30 and the signal line 60 can be performed. The switching element 62 is connected to a scanning line 64 drawn out from a not-shown scanning circuit, and is driven (on/off) by a scanning signal inputted to the scanning line 64.

Figure 4:
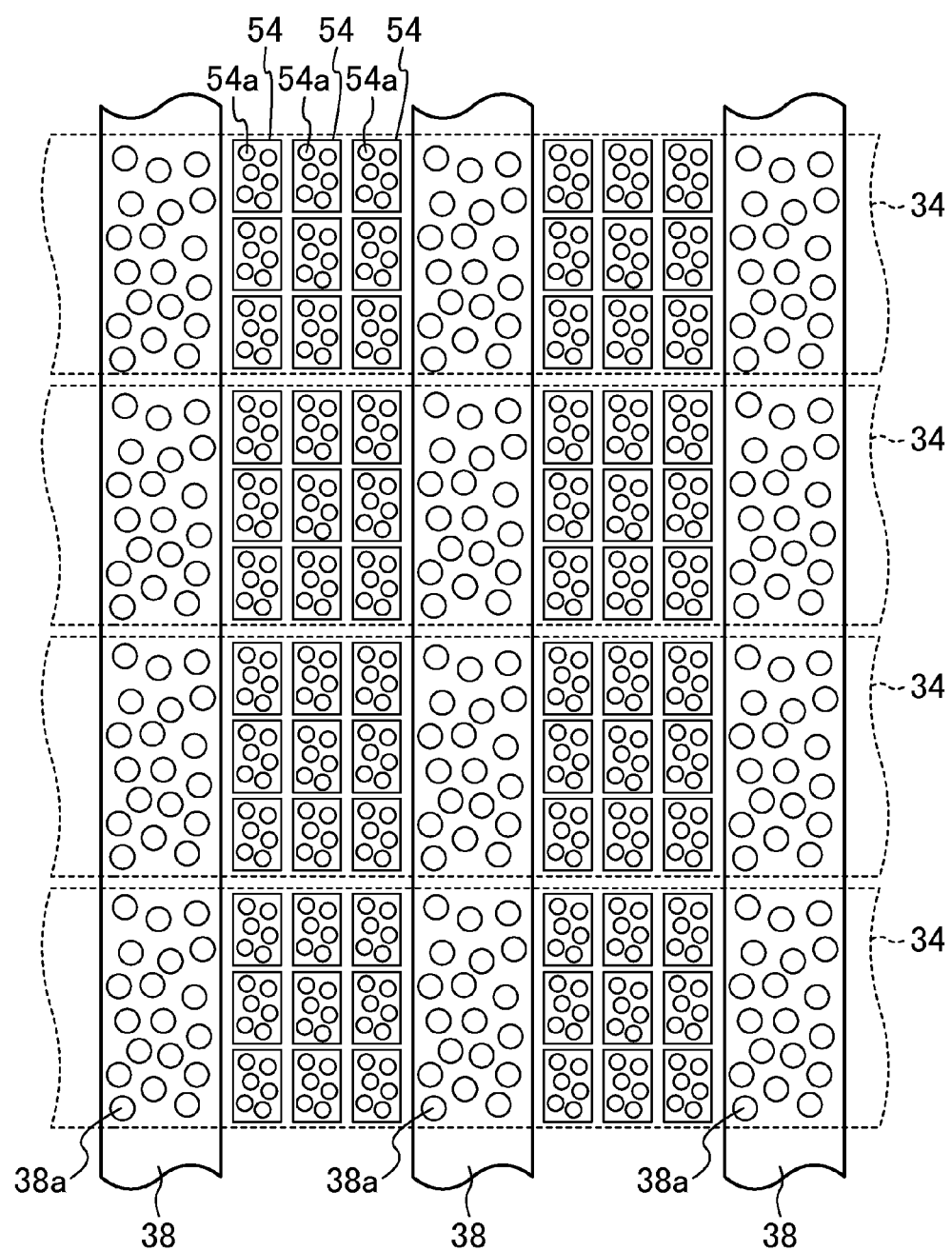
FIG. 4 is a plan view showing details of a detection electrode.

FIG. 4 is a plan view showing the details of the detection electrodes 38. The plural detection electrodes 38 extend in the longitudinal direction and the adjacent detection electrodes are arranged side by side in the lateral direction. Incidentally, the plural common electrodes 34 indicated by broken lines extend in the lateral direction and the adjacent common electrodes are arranged side by side in the longitudinal direction. The plural detection electrodes 38 are arranged with intervals between the adjacent detection electrodes. The interval is provided so that the fringe electric filed can be increased. The detection electrode 38 includes through holes 38*a*. The detection electrode 38 is made of a conductive material having a high transmittance to visible light, for example, ITO (Indium Tin Oxide). However, when the film thickness becomes thick, the detection electrode is easily visually recognized from the outside. Then, the through holes 38*a* are formed in the detection electrode 38, so that the detection electrode 38 is hard to be visually recognized and the image is easily visually seen.

Dummy electrodes 54 are disposed between the adjacent detection electrodes 38. A gap is provided between the detection electrode 38 and the dummy electrode 54. In the example of FIG. 4, the plural dummy electrodes 54 are arranged side by side with intervals in the interval direction between the adjacent detection electrodes 38. Besides, the plural dummy electrodes 54 are also arranged side by side with intervals in the direction (longitudinal direction) in which the detection electrodes 38 extend. The dummy electrode 54 is made of the same material as the detection electrode 38. The detection electrodes 38 can be made hard to be visually recognized also by disposing the dummy electrodes 54 between the detection electrodes 38, and the image can be made easily visually seen by this.

The dummy electrodes 54 are in an electrically floating state. That is, the dummy electrodes 54 are not connected to a reference potential such as GND, and are not connected to the detection electrodes 38 and other wiring. However, when necessary, the dummy electrodes 54 may be connected to the reference potential such as GND. The plural dummy electrodes 54 are arranged with intervals between the adjacent dummy electrodes. The dummy electrode 54 includes dummy through holes 54a. When the dummy electrodes 54 are disposed, a region where the conductor does not exist becomes narrow, and the fringe electric field decreases. However, since the dummy through holes 54a are formed, the amount of decrease of the fringe electric field is small. Besides, the dummy through holes 54a are formed, so that the dummy electrodes 44 are hard to be visually recognized, and the image is easily visually seen.

Figure 5:
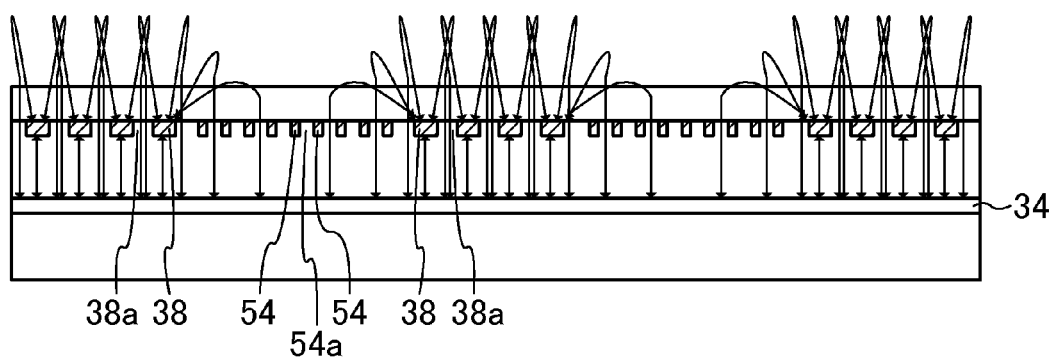
FIG. 5 is a view showing an electric field generated between the detection electrode and a common electrode.

FIG. 5 is a view showing the electric field generated between the detection electrodes 38 and the common electrodes 34. The electric field (normal electric field) is generated as indicated by electric lines of force in the opposing region between the detection electrode 38 and the common electrode 34 (between the opposing surfaces). Besides, the fringe electric field as indicated by electric lines of force is generated in a region except for the opposing region between the detection electrode 38 and the common electrode 34. The fringe electric field is mainly distributed between the edge of the detection electrode 38 and the common electrode 34. Since the detection electrode 38 includes the through holes 38a, the number of edges increase. Thus, the normal electric field generated in the opposing region between the detection electrode 38 and the common electrode 34 decreases, and the fringe electric field coming around from the outside of both increases.

Figure 6:
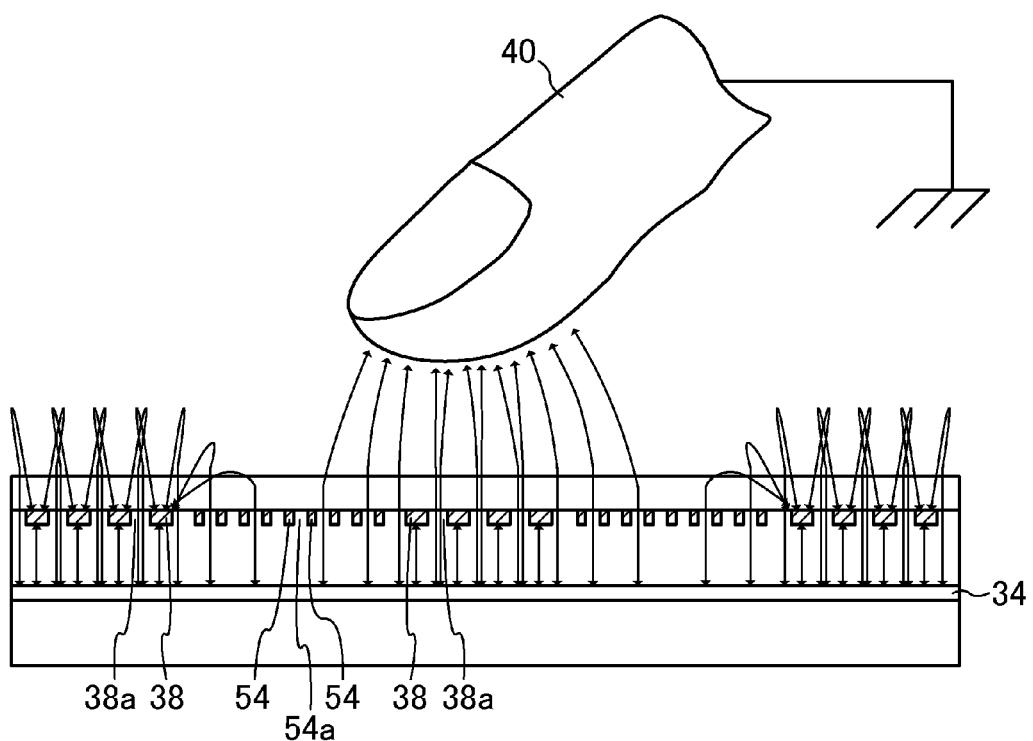
FIG. 6 is a view for explaining an operation to detect the presence or absence of touch.

FIG. 6 is a view for explaining the operation of detecting the presence or absence of touch. The fringe electric field is used to detect the presence or absence of the touch. For example, when the finger touches, the finger 40 becomes GND and interrupts the fringe electric field. Since the capacitance formed between the detection electrode 38 and the common electrode 34 is decreased by this, the presence or absence of the touch can be detected by detecting the decrease (capacitance difference).

In this embodiment, as described above, since the through holes 38a are formed in the detection electrode 38, the fringe electric field increases. When a touch is performed, since the increased fringe electric field is interrupted, the capacitance is significantly decreased. Accordingly, the detection sensitivity of the touch can be improved.

Figure 7:
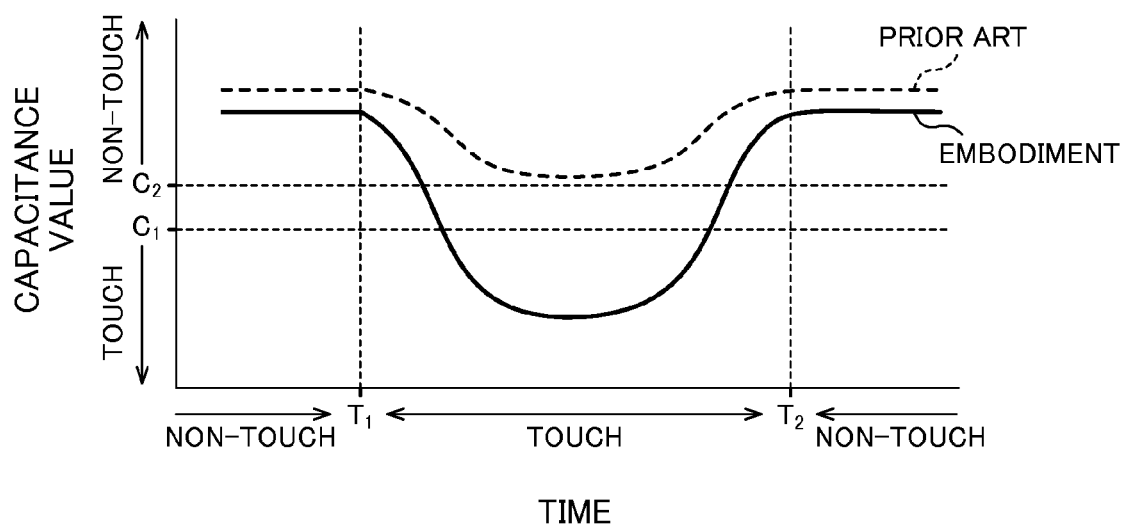
FIG. 7 is a view for comparing the embodiment with the prior art with respect to change in capacitance due to the presence or absence of touch.

FIG. 7 is a view for comparing this embodiment with the prior art with respect to the change in capacitance due to the presence or absence of touch. A touch occurs during a period of T1 to T2, and a change in capacitance is shown in the graph. As compared with the prior art, it is understood that in this embodiment, the change in capacitance (capacitance difference) due to the presence or absence of the touch is large. In this embodiment, for example, the circuit is designed such that it is determined that the touch occurs when the capacitance is detected to become smaller than C1, and it is determined that there is no touch when the capacitance is detected to become larger than C2. An erroneous operation is prevented by providing the difference between C1 and C2, and as the difference increases, the erroneous operation becomes hard to be performed. In this embodiment, since the change in capacitance (capacitance difference) due to the presence or absence of the touch is large, the difference between C1 and C2 can be increased. By this, the erroneous operation of erroneously recognizing the presence or absence of the touch can be prevented.

Figure 8:
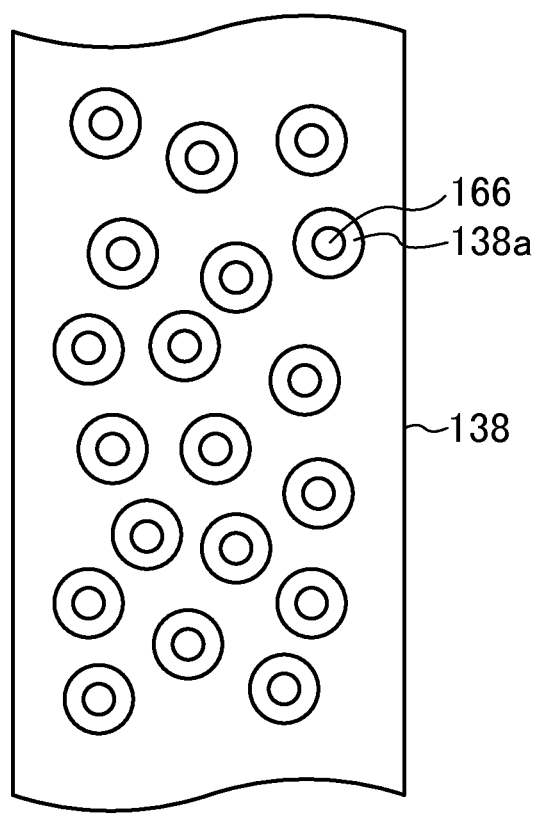
FIG. 8 is a view showing modified example 1 of the embodiment.

FIG. 8 is a view showing modified example 1 of the embodiment. In this example, a detection electrode 138 includes a land part 166 in an electrically floating state inside a through hole 138a. The through hole 138a can be made hard to be visually recognized by providing the land part 166, and an image can be made easily visually seen by this.

Figure 9:
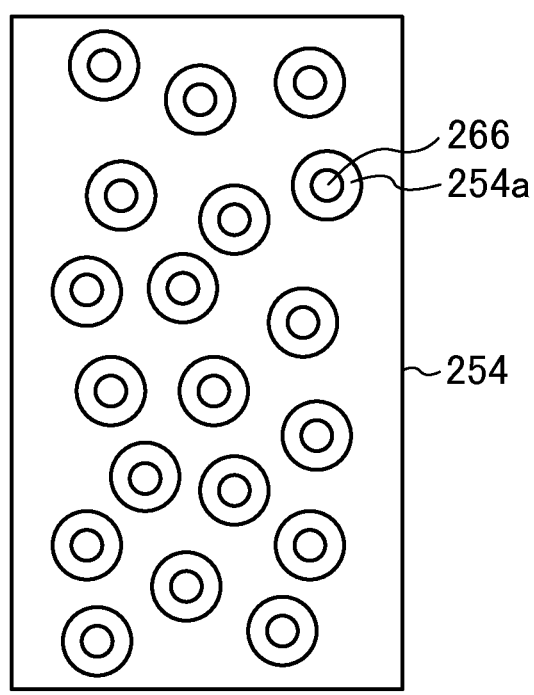
FIG. 9 is a view showing modified example 2 of the embodiment.

FIG. 9 is a view showing modified example 2 of the embodiment. In this example, a dummy electrode 254 includes a dummy land part 266 in an electrically floating state inside a dummy through hole 254a. The dummy through hole 254a can be made hard to be visually recognized by providing the dummy land part 266, and an image can be made easily visually seen by this.

Figure 10:
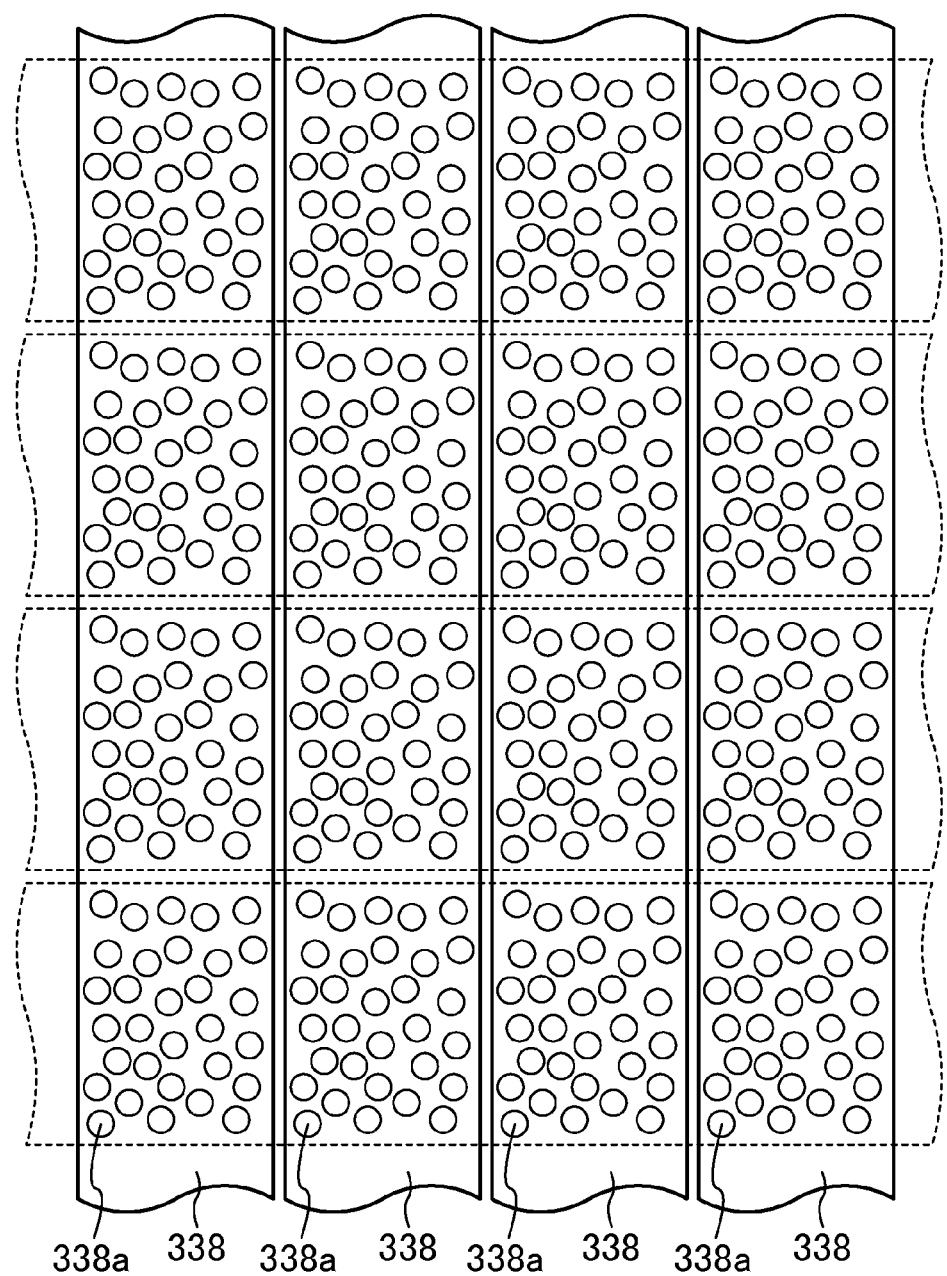
FIG. 10 is a view showing modified example 3 of the embodiment.

FIG. 10 is a view showing modified example 3 of the embodiment. In this example, the dummy electrode is eliminated, and an interval between adjacent detection electrodes 338 is narrowed. Since the interval between the detection electrodes 338 is narrowed, the width of the detection electrode 338 can be increased, and the resistance can be decreased. Besides, since the interval is narrow, the detection electrode 338 is hard to be visually recognized, and an image is easily visually seen by this. Incidentally, when the interval between the adjacent detection electrodes 338 is narrowed, a region through which electric lines of force pass becomes narrow, and the fringe electric field passing through between the adjacent detection electrodes 338 is weakened. However, the fringe electric field is increased by forming through holes 338a.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device with a built-in touch panel, comprising:
   a first substrate;
   a second substrate;
   a plurality of pixel electrodes provided between the first substrate and the second substrate;
   a plurality of common electrodes arranged next to each other with a space therebetween and provided between the first substrate and the second substrate; and
   a plurality of detection electrodes provided on the first substrate to face the respective common electrodes, wherein
   an image is displayed by light control using an electric field generated between the plurality of pixel electrodes and the plurality of common electrodes,
   presence or absence of a touch is detected by a difference in capacitance due to presence or absence of a material interrupting the electric field generated between one of the detection electrodes and one of the common electrodes, and
   each of the detection electrodes has through holes at positions facing a corresponding one of the common electrodes, avoiding a position above the space between common electrodes of the plurality of common electrodes that are next to each other.

2. The display device with the built-in touch panel according to claim 1, wherein a land part in an electrically floating state is provided inside each of the through holes.

3. The display device with the built-in touch panel according to claim 1, wherein
   the plurality of detection electrodes are arranged with intervals between the adjacent detection electrodes,
   a dummy electrode in an electrically floating state is provided between the adjacent detection electrodes, and
   the dummy electrode includes a dummy through hole.

4. The display device with the built-in touch panel according to claim 3, wherein a dummy land part in an electrically floating state is provided inside the dummy through hole.

5. The display device with the built-in touch panel according to claim 1, wherein
   the plurality of common electrodes extend in a lateral direction and the adjacent common electrodes are arranged side by side in a longitudinal direction, and
   the plurality of detection electrodes extend in the longitudinal direction and the adjacent detection electrodes are arranged side by side in the lateral direction.

6. The display device with the built-in touch panel according to claim 1, further comprising a liquid crystal layer provided between the first substrate and the second substrate and above the plurality of common electrodes.

7. The display device with the built-in touch panel according to claim 1, wherein the through holes, each of which has a round shape, are arranged at random in different positions.

\* \* \* \* \*